United States Patent
Haldeman et al.

(10) Patent No.: US 9,832,396 B2
(45) Date of Patent: Nov. 28, 2017

(54) COMPOSITE IMAGE PROCESSING FOR LWIR IMAGES USING GEOMETRIC FEATURES

(71) Applicant: United Technologies Corporation, Hartford, CT (US)

(72) Inventors: Charles W. Haldeman, Simsbury, CT (US); Andrew Consiglio, Southbury, CT (US); Christopher J. Lehane, South Windsor, CT (US); Mark F. Zelesky, Bolton, CT (US)

(73) Assignee: United Technologies Corporation, Farmington, CT (US)

( * ) Notice: Subject to any disclaimer, the term of this patent is extended or adjusted under 35 U.S.C. 154(b) by 414 days.

(21) Appl. No.: 14/560,814

(22) Filed: Dec. 4, 2014

(65) Prior Publication Data
US 2015/0172565 A1 Jun. 18, 2015

Related U.S. Application Data

(60) Provisional application No. 61/917,756, filed on Dec. 18, 2013.

(51) Int. Cl.
*H04N 5/33* (2006.01)
*G06T 7/33* (2017.01)
*G06T 5/50* (2006.01)

(52) U.S. Cl.
CPC .............. *H04N 5/33* (2013.01); *G06T 5/50* (2013.01); *G06T 7/33* (2017.01);
(Continued)

(58) Field of Classification Search
CPC . G06T 2207/30164; G06T 2207/10048; G06T 2207/20221; H04N 5/33; H04N 5/265
See application file for complete search history.

(56) References Cited

U.S. PATENT DOCUMENTS

| | | | |
|---|---|---|---|
| 5,519,529 A | 5/1996 | Ahearn et al. | |
| 6,157,749 A | 12/2000 | Miyake | |

(Continued)

FOREIGN PATENT DOCUMENTS

| | | |
|---|---|---|
| EP | 1075135 A2 | 2/2001 |
| WO | WO2009016624 A2 | 2/2009 |

*Primary Examiner* — Obafemi Sosanya
(74) *Attorney, Agent, or Firm* — Kinney & Lange, P.A.

(57) ABSTRACT

A method for thermally imaging a moving workpiece of a gas turbine engine comprises identifying a plurality of geometric features to construct a composite image. The geometric features include at least one integral thermal feature of the moving workpiece, and at least one artificial feature applied to the workpiece for diagnostic purposes. One of the plurality of geometric features is identified as a master feature, and the remainder of the plurality of geometric features are located relative to the master feature with relative actual coordinates. A pixel location of the master feature is identified or each image, and the remainder of the plurality of geometric features are located relative to the master feature with relative pixel coordinates. Offset, rotation, and scaling of the secondary images are varied to minimize a relative difference between the relative pixel coordinates and the relative actual coordinates. The offset, rotated, and scaled secondary images are combined with the reference image to form a composite image.

17 Claims, 4 Drawing Sheets

(52) U.S. Cl.
CPC ............... *G06T 2207/10016* (2013.01); *G06T 2207/10048* (2013.01); *G06T 2207/20221* (2013.01); *G06T 2207/30164* (2013.01)

(56) References Cited

U.S. PATENT DOCUMENTS

| | | |
|---|---|---|
| 7,345,277 B2 | 3/2008 | Zhang |
| 7,702,015 B2 | 4/2010 | Richter et al. |
| 8,351,069 B2 | 1/2013 | Fujishita |
| 8,410,441 B2 | 4/2013 | Stratmann et al. |
| 8,413,493 B1 * | 4/2013 | Polywoda, III ....... G01M 15/14 73/112.01 |
| 8,515,209 B2 | 8/2013 | Shiraishi |
| 2002/0104831 A1 * | 8/2002 | Chang ................ B23K 26/0075 219/121.7 |
| 2004/0120383 A1 | 6/2004 | Kennedy et al. |
| 2008/0137105 A1 * | 6/2008 | Howard ................ G01N 25/72 356/630 |
| 2008/0170777 A1 * | 7/2008 | Sullivan ................... G06T 7/33 345/475 |
| 2011/0267428 A1 * | 11/2011 | George ............. G01N 21/9515 348/46 |
| 2011/0267451 A1 * | 11/2011 | Drescher .......... G01N 21/95692 348/92 |
| 2013/0050466 A1 | 2/2013 | Cetin et al. |
| 2013/0222604 A1 | 8/2013 | Ingerhed et al. |
| 2013/0251287 A1 | 9/2013 | Kawamura et al. |

* cited by examiner

COMPOSITE IMAGE PROCESSING FOR LWIR IMAGES USING GEOMETRIC FEATURES

BACKGROUND

The present invention relates generally to image processing, and more particularly to image processing for thermal imaging of a gas turbine engine, in use.

Gas turbine engines are used in a wide variety of applications, from aircraft engines to industrial power generators. Engine parts can degrade with time, and parts subjected to high thermal stresses are particularly vulnerable. Diagnostic systems can identify and pinpoint degrading parts before failures can occur enable efficient maintenance procedures, decrease unexpected engine downtimes, increase engine life, and avoid catastrophic failures.

Thermal imaging is particularly useful for gas turbine diagnostics. Unexpected heating can correspond to part degradation, cooling channel blockage, or other maintenance indicators. By comparing thermal images of a turbine engine workpiece against thermal images of expected heat profiles, thermal imaging systems can assist in engine diagnostics. Diagnostic precision is limited by the precision of cameras, and can be further limited by background heat, by the speed of workpieces (e.g. engine rotors) relative to camera shutter rates, and by vibration within the gas turbine engine.

SUMMARY

A method for thermally imaging a moving workpiece of a gas turbine engine comprises identifying a plurality of geometric features to construct a composite image. The geometric features include at least one integral thermal feature of the moving workpiece, or at least one artificial feature applied to the workpiece for diagnostic purposes. One of the plurality of geometric features is identified as a master feature, and the remainder of the plurality of geometric features are located relative to the master feature with relative actual coordinates. A pixel location of the master feature is identified or each image, and the remainder of the plurality of geometric features are located relative to the master feature with relative pixel coordinates. Offset, rotation, and scaling of the secondary images are varied to minimize a relative difference between the relative pixel coordinates and the relative actual coordinates. The offset, rotated, and scaled secondary images are combined with the reference image to form a composite image.

DETAILED DESCRIPTION

Figure 1:
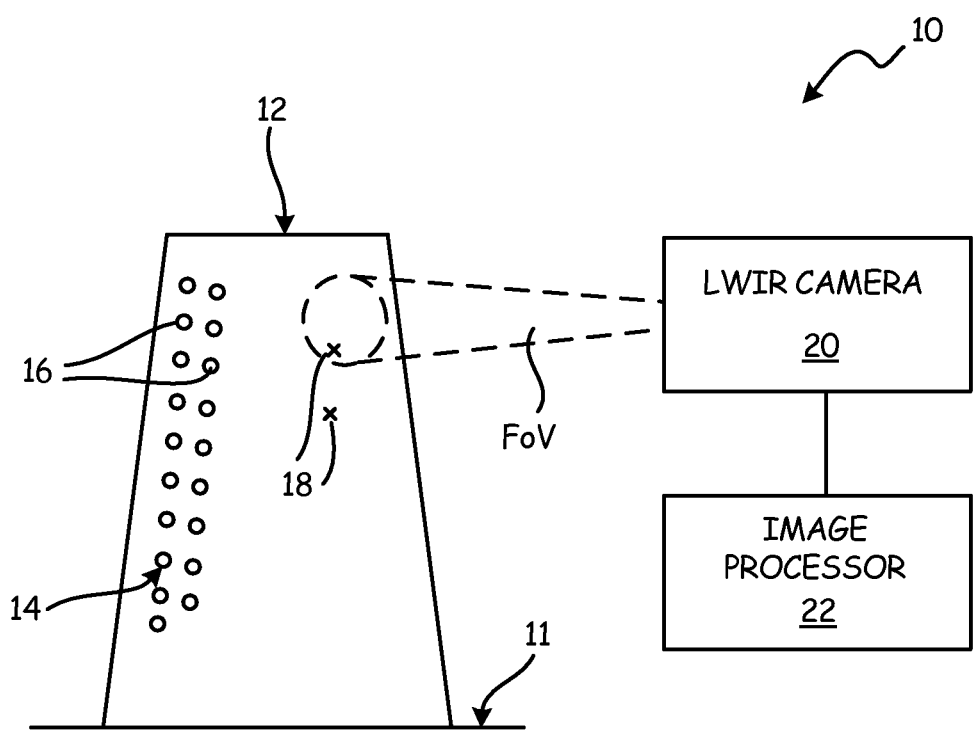
FIG. 1 is schematic view of one embodiment of a thermal imaging system according to the present invention.

FIG. 1 is a schematic view of thermal imaging system 10 and workpiece 12 of gas turbine engine 11 (only a portion of engine 11 is shown). Gas turbine engine 11 can, for instance, be an aircraft main turbine, an aircraft auxiliary power unit, or an industrial power turbine. Workpiece 12 is a component of gas turbine engine 11 such as a turbine or compressor section rotor blade. Workpiece 12 has a plurality of well-defined geometric features 14. Geometric features 14 can include both integral features 16, such as cooling holes or surface irregularities of workpiece 12, and artificial features 18, such as marks, masks, or targets applied to workpiece 12 specifically for diagnostic purposes.

Imaging system 10 includes sensor 20 and image processor 22. Sensor 20 is a long wavelength infrared (LWIR) camera is disposed to capture images of workpiece 12 while workpiece 12 is in motion. In particular, LWIR camera 20 can be disposed permanently (e.g. for continual failure monitoring) or temporarily (e.g. for intensive maintenance or testing) within gas turbine engine 11, such that LWIR camera 20 captures a plurality of thermal images of workpiece 12 during operation of gas turbine engine 11. LWIR radiation can be used to minimize reflections from other components within ordinary operating temperatures of gas turbine engine 11. LWIR camera 20 has a field of view (marked FoV) that processes across at least a part of workpiece 12 while workpiece 12 is in motion during operation of gas turbine engine 11.

Image processor 22 can, for instance, include a microprocessor or programmable computer with suitable memory and other hardware that combines images captured by LWIR camera 20 to form a composite thermal images of workpiece 12 according to the method set forth below with respect to FIGS. 3-6. Image processor 22 can be situated within gas turbine engine 11, or can receive captured images from LWIR camera 20 remotely.

Although only one LWIR camera 20 is shown in FIG. 1, some embodiments of the present invention can include multiple LWIR cameras. Image processor 22 can process images from multiple cameras to produce multiple composite images. In addition, image processor 22 can in some embodiments process images from multiple cameras with overlapping fields of view of workpiece 12 to produce shared composite images. Each LWIR camera 20 has a different field of view. Not only is each LWIR camera necessarily situated in a different location, different LWIR cameras can have different angular orientation and zoom.

Figure 2:
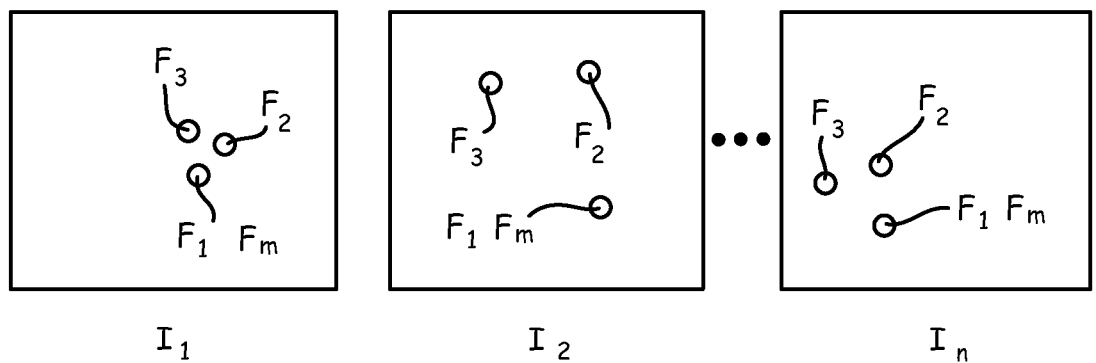
FIG. 2 schematic view of a plurality of images captured by the thermal imaging system of FIG. 1.

FIG. 2 is a schematic view of images $I_1, I_2, \ldots I_n$. Images $I_1, I_2, \ldots I_n$ are thermal images of workpiece 12 captured by LWIR camera 20 (see FIG. 1), or by multiple LWIR cameras with overlapping fields of view, during operation of gas turbine engine 11. Each image $I_1, I_2, \ldots I_n$ is shown with three illustrative features sub-images $F_1, F_2,$ and $F_3$, respectively, corresponding to geometric features 14 visible in all three images. Images $I_1, I_2, \ldots I_n$ can, for example, be consecutive images in time captured by LWIR camera 20 as workpiece 12 moves through the field of view of LWIR camera 20. Despite corresponding to the same geometric features 14 of workpiece 12, features sub-images $F_1, F_2, F_3$ are not necessarily located in identical positions on images $I_1, I_2, \ldots I_n$. This variation in feature image location is due in part to movement of workpiece 12 between capture of sequential images from the same LWIR camera 20, e.g. due to vibration or rotation of a rotor blade while gas turbine engine 11 is in operation. Variation between images can be due to differences in the fields of view of separate LWIR cameras 20, or in changes to the field of view of a single LWIR camera 20 over time (e.g. for LWIR cameras 20 actuatable to change orientation or vary zoom level). By using both integral features 16 and artificial features 18 to normalize images, thermal imaging system 10 ensures that two, or alternatively at least three geometric features 14 are visible in each image $I_1, I_2, \ldots I_n$. Although FIG. 2 depicts the same three features sub-images $F_1, F_2,$ and $F_3$ in all three images $I_1, I_2, \ldots I_n$, different subsets of geometric features 14 can be used from image to image, so long as each image $I_j$ shares multiple features with other images. In FIG. 2, feature image $F_1$ is additionally labeled as master image $F_M$. Other features (e.g. $F_2$ and $F_3$) are hereinafter referred to as secondary features.

Figure 3:
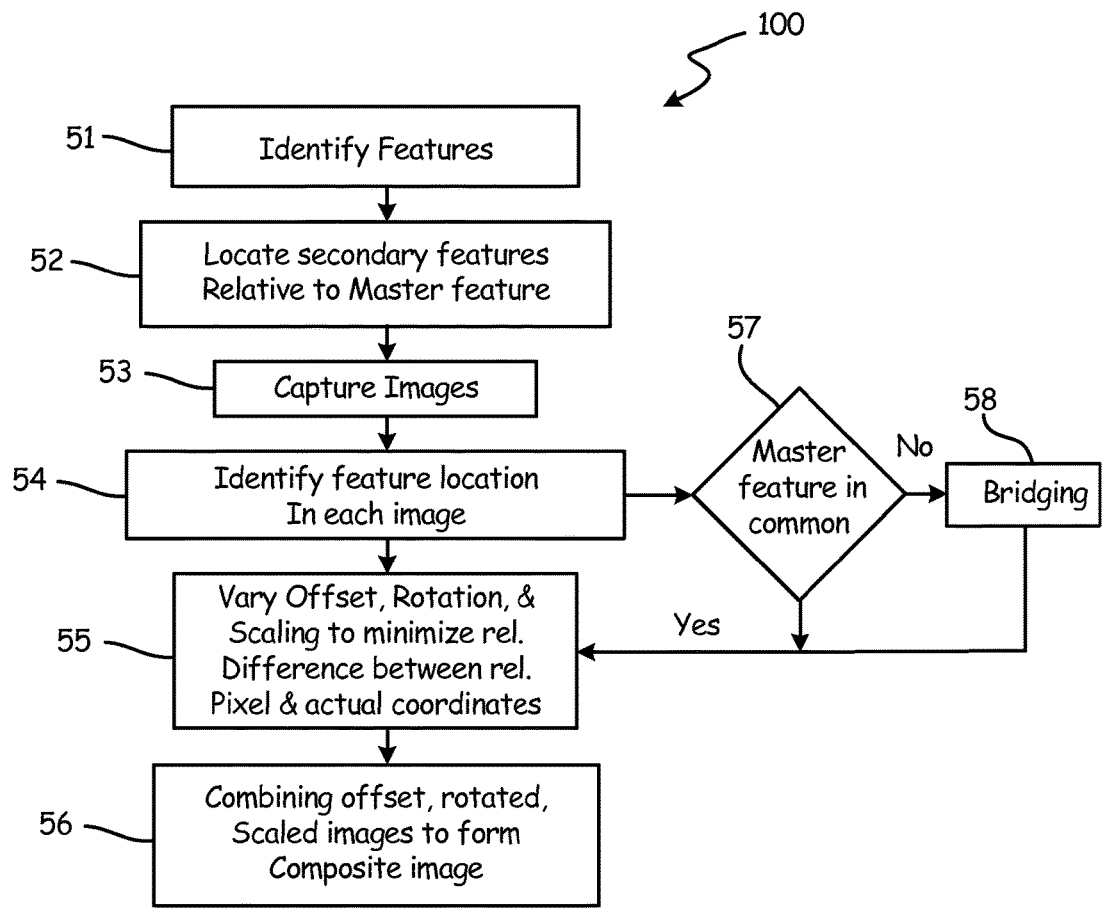
FIG. 3 is a method flowchart illustrating an image processing method by which a composite images is constructed from the captured images of FIG. 2.

FIG. 3 is a method flowchart illustrating a method by which thermal imaging system 10 produces a composite image $I_C$ from captured thermal images $I_1, I_2, \ldots I_n$. First, a plurality of geometric features 14 likely to appear in images thermal images $I_1, I_2, \ldots I_n$ are established. (Step S1). This identification can be done by processor 22 during operation of thermal imaging system 10, or can be prepared in advance based on known geometry of workpiece 12. As discussed with respect to FIG. 2, one feature is designated master feature $F_M$, while all other features are designated as secondary features $F_S$. Each secondary feature is identified with real coordinates $X_{real}$ relative to master feature $F_M$. (Step S2). Real coordinates $X_{real}$ are determined based on a shape of workpiece 12 known from direct study, e.g. from measurement or design specifications of workpiece 12. Real coordinates $X_{real}$ can, for instance, be derived from known absolute coordinates or relative dimensions within workpiece 12. Real coordinates $X_{real}$ are pointer vectors with dimensions of physical distance.

At least one LWIR camera 20 captures images $I_1, I_2, \ldots I_n$ of workpiece 12 with fields of view encompassing master feature $F_M$ and secondary features $F_S$. (Step S3). $I_1, I_2, \ldots I_n$ include at least one reference image $I_{ref}$ and a plurality of secondary images $I_{sec}$. In some embodiments, images $I_1, I_2, \ldots I_n$ can also include images with fields of view that do not encompass master feature $F_M$, in which case secondary master features M' can be additionally be designated, as discussed further below. Processor 22 recognizes features $F_M$ and $F_S$ based on shape, size, and thermal profile, and identifies a pixel coordinate $X_{pixel}$ within each image that locates each secondary feature $F_S$ relative to master feature $F_M$. (Step S4). Pixel coordinates $X_{pixel}$ are relative coordinates comprising pointer vectors from images of master feature $F_M$ to images of secondary features $F_S$, with dimensions of pixel distance.

Processor 22 separately assigns and varies offset, rotation, and scaling of each secondary image $I_{sec}$ relative to reference image $I_{ref}$ so as to minimize relative difference $\Delta$ between real coordinates $X_{real}$ and pixel coordinates $X_{pixel}$ of each secondary feature $F_S$. (Step S5). Relative difference can be defined for this purpose as either absolute deviation or least squares deviation, or any other parameter estimation method. Processor 22 can, for example, sequentially vary each of an offset O, a an angular rotation $\Theta$, and a scaling factor S so as to achieve local minima in $\Delta$, iterating through a plurality of such cycles until either a limit is exceeded for a maximum number of cycles, or $\Delta$ falls below a satisfactory threshold.

Figure 4:
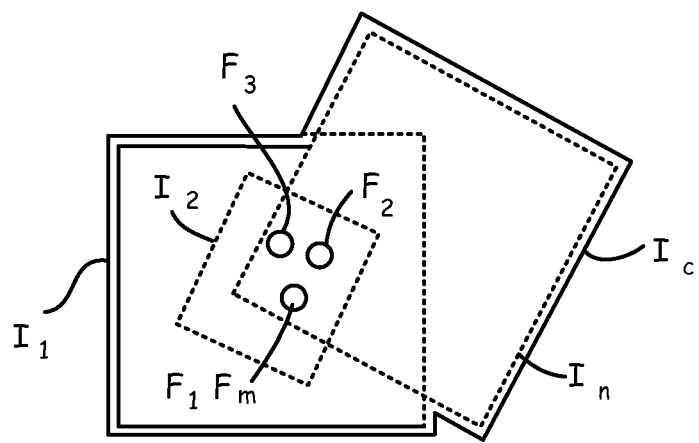
FIG. 4 is an overlay of the plurality of images of FIG. 2, scaled, rotated, and translated to form a composite image.

FIG. 4 is an overlay of images $I_1, I_2,$ and $I_n$, scaled, rotated, and translated to form a composite image $I_C$. Processor 22 forms composite image 22 by combining reference image $I_{ref}$ with altered versions of secondary images $I_{sec}$ translated, rotated, and scaled according to calculated values O, $\Theta$, and S, for each secondary image $I_{sec}$. (Step S6). As illustrated in FIG. 4, different images can cover different field of view. Where multiple images overlap, composite image $I_C$ has magnitude equal to average pixel magnitude of all overlapping adjusted images. In many instances, adjustment of images according to calculated values O, $\Theta$, and S can leave adjusted secondary images $I_{sec}$ with non-integer pixel locations. Processor 22 interpolates such non-integer pixel locations onto the pixel grid spacing of reference images $I_{ref}$.

In some embodiments multiple master features can be used to determine normalizing adjustments for images with fields of view that do not encompass master feature $F_M$. This may, for instance, be due to obstruction of the field of view of LWIR camera 20, e.g. by due to rotation and the presence of other blades. In general, the approach discussed above with respect to master feature $F_M$ and reference images $I_{ref}$ can be repeated with bridging reference images $I_{ref}'$ and bridging master features $F_M'$ common to subsets of thermal images $I_1, I_2, \ldots, I_n$ in which master features $F_M$ does not appear. Processor 22 determines whether master feature $F_M$ is common to all images. (Step S7). If not, Processor 22 defines bridging features and references as described above. (Step S8). Resulting composite images $I_C$ and $I_C'$ can be aggregated to form an extended second order composite images $I_C''$ utilizing all thermal images $I_1, I_2, \ldots, I_n$, so long as sufficient features exist in common to composite images $I_C$ and $I_C'$.

Figure 5:
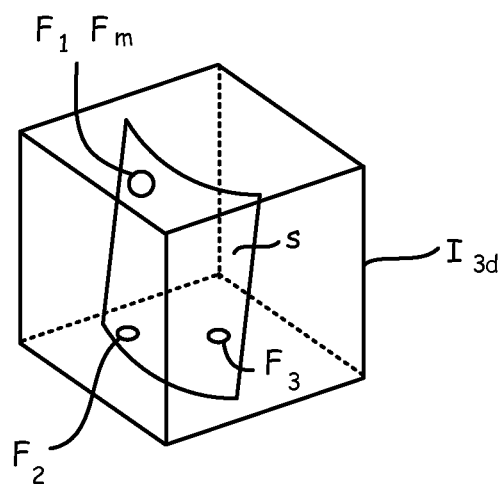
FIG. 5 is a schematic illustration of a 3D composite image produced according to the method of FIG. 3.

FIG. 5 is a schematic illustration of a 3D composite image $I_{3D}$. The present invention uses known dimensions and locations of geometric feature 14 to provide reference points for normalization and combination of thermal images $I_1, I_2, \ldots, I_n$ into composite image $I_C$. By utilizing both integral features 16 and artificial features 18, thermal imaging system 10 ensures that at least some features will overlap from image to image, among all thermal images $I_1, I_2, \ldots, I_n$, thereby enabling each images to be mapped to known geometry of workpiece 12. This known geometry may further allow 2D images $I_1, I_2, \ldots, I_n$ to be projected into a 3D heat model of workpiece 12 by separately accounting for the field of view of each images $I_1, I_2, \ldots, I_n$. FIG. 5 illustrates an exemplary known workpiece surface S onto which feature sub-images $F_1, F_2,$ and $F_3$ are mapped in 3D composite image $I_{3D}$.

DISCUSSION OF POSSIBLE EMBODIMENTS

The following are non-exclusive descriptions of possible embodiments of the present invention.

A method for thermally imaging a moving workpiece of a gas turbine engine, the method comprising: assigning a plurality of geometric features including at least one integral thermal feature of the moving workpiece, and at least one artificial feature applied to the workpiece for diagnostic purposes; identifying one of the plurality of geometric features as a master feature, and locating the remainder of the plurality of geometric features relative to the master feature with relative actual coordinates; capturing thermal images the moving workpiece, including a reference image and a plurality of secondary images; for each image, identifying a pixel location of the master feature, and locating the remainder of the plurality of geometric features relative to the master feature with relative pixel coordinates; varying an offset, rotation, and scaling of the secondary images to minimize a relative difference between the relative pixel coordinates and the relative actual coordinates; and combining the offset, rotated, and scaled secondary images with the reference image to form a composite image.

The method of the preceding paragraph can optionally include, additionally and/or alternatively, any one or more of the following features, configurations and/or additional components:

A further embodiment of the foregoing method, wherein the integral thermal feature is a cooling hole.

A further embodiment of the foregoing method, wherein the artificial feature is a mask, target, or mark.

A further embodiment of the foregoing method, wherein each of the thermal images of the moving workpiece is an average image over multiple raw images.

A further embodiment of the foregoing method, wherein the thermal images are long wavelength infrared (LWIR) images.

A further embodiment of the foregoing method, wherein images from multiple LWIR cameras are included among the thermal images.

A further embodiment of the foregoing method, wherein varying an offset, rotation, and scaling of the secondary images to minimize a relative difference between the relative pixel coordinates and the relative actual coordinates comprises iteratively and sequentially varying each of the offset, rotation, and scaling to achieve local minima in difference between the relative pixel coordinates and the relative actual coordinates.

A method for processing a plurality of long wavelength infrared (LWIR) images of a workpiece, including a reference image and a plurality of secondary images, the method comprising: assigning a plurality of geometric features in each LWIR image, including a master feature and a plurality of secondary features; determining actual coordinates of the secondary features relative to the master feature by direct study of the workpiece; calculating pixel coordinates of the secondary features relative to the master feature within each of the LWIR images. varying an offset, rotation, and scaling of the secondary images to minimize a relative difference between the relative pixel coordinates and the relative actual coordinates; and combining the offset, rotated, and scaled secondary images with the reference image to form a composite image.

The method of the preceding paragraph can optionally include, additionally and/or alternatively, any one or more of the following features, configurations and/or additional components:

A further embodiment of the foregoing method, wherein the integral thermal feature is a cooling hole.

A further embodiment of the foregoing method, wherein the artificial feature is a mask, target, or mark.

A further embodiment of the foregoing method, wherein each of the thermal images of the moving workpiece is an average image over multiple raw images.

A further embodiment of the foregoing method, wherein images from multiple LWIR cameras are included among the thermal images.

A further embodiment of the foregoing method, further comprising: assigning a bridging master feature and bridging secondary features; determining bridging actual coordinates of the bridging secondary features relative to the bridging master feature by direct study of the workpiece; calculating bridging pixel coordinates of the bridging secondary features relative to the bridging master feature within each of the LWIR images. varying an offset, rotation, and scaling of the bridging secondary images to minimize a relative difference between the bridging relative pixel coordinates and the bridging relative actual coordinates; combining the offset, rotated, and scaled secondary images with the reference image to form a bridging composite image; and combining the composite image and the bridging composite image to form an extended second order composite image.

A further embodiment of the foregoing method, wherein varying an offset, rotation, and scaling of the secondary images to minimize a relative difference between the relative pixel coordinates and the relative actual coordinates comprises iteratively and sequentially varying each of the offset, rotation, and scaling to achieve local minima in difference between the relative pixel coordinates and the relative actual coordinates.

A gas turbine engine thermal imaging system comprising: a camera disposed to capture a plurality of thermal images of a moving workpiece with geometric features including at least on integral thermal feature, and at least one artificial feature applied to the workpiece for diagnostic purposes; and a processor configured to produce a composite thermal image of the moving workpiece by: identifying one of the plurality of geometric features as a master feature, and locating the remainder of the plurality of geometric features relative to the master feature with relative actual coordinates; capturing thermal images the moving workpiece, including a reference image and a plurality of secondary images; for each image, identifying a pixel location of the master feature, and locating the remainder of the plurality of geometric features relative to the master feature with relative pixel coordinates; varying an offset, rotation, and scaling of the secondary images to minimize a relative difference between the relative pixel coordinates and the relative actual coordinates; and combining the offset, rotated, and scaled secondary images with the reference image to form a composite image.

A further embodiment of the foregoing gas turbine engine thermal imaging system, wherein the camera is a long wavelength infrared (LWIR) camera.

A further embodiment of the foregoing gas turbine engine thermal imaging system, wherein the camera is disposed to capture a plurality of thermal images of a rotating airfoil.

A further embodiment of the foregoing gas turbine engine thermal imaging system, wherein the camera is disposed to capture the plurality of thermal images while the gas turbine engine is in operation.

A method for processing a plurality of long wavelength infrared (LWIR) images using at least one processor, the method comprising: determining average pixel intensity and pixel variation in intensity for each pixel across the plurality of LWIR images; determining average area intensity and area variation in intensity across a range of areas defined by increasing length scales about a selected pixel; identifying as a critical length scale a minimum length scale below which the area variation in intensity increases precipitously; and building a composite image wherein each pixel of the composite image has intensity equal to an average area intensity centered on that pixel, over a the critical length scale.

The method of the preceding paragraph can optionally include, additionally and/or alternatively, any one or more of the following features, configurations and/or additional components:

A further embodiment of the foregoing method, wherein capturing the plurality of LWIR images comprises sequentially capturing a series of images with a single LWIR camera.

A further embodiment of the foregoing method, wherein capturing the plurality of LWIR images comprises capturing at least a first image with a first LWIR camera, and at least a second image with a second LWIR camera.

A further embodiment of the foregoing method, further comprising mapping isothermal lines of the composite image, at a natural resolution equal to the critical length scale.

A further embodiment of the foregoing method, wherein identifying the areas defined by increasing length scales about the selected pixel are defined by taxicab geometric distance from the selected pixel equal to the increasing length scale.

A further embodiment of the foregoing method, wherein identifying the areas defined by increasing length scales about the selected pixel are defined by Cartesian distance from the selected pixel equal to the increasing length scale.

A gas turbine engine thermal imaging system comprising: a camera disposed to capture a plurality of thermal images of a moving workpiece of the gas turbine engine; and a processor configured to produce a composite thermal image of the moving workpiece by: determining average pixel intensity and pixel variation in intensity for each pixel across the plurality of thermal images captured by the camera; determining average area intensity and area variation in intensity across a range of areas defined by increasing length scales about a selected pixel; identifying as a critical length scale a minimum length scale below which the area variation in intensity increases precipitously; and building the composite image such that each pixel of the composite image has intensity equal to an average area intensity centered on that pixel, over a the critical length scale.

The gas turbine engine thermal imaging system of the preceding paragraph can optionally include, additionally and/or alternatively, any one or more of the following features, configurations and/or additional components:

A further embodiment of the foregoing gas turbine engine thermal imaging system, wherein the camera is a long wavelength infrared (LWIR) camera.

A further embodiment of the foregoing gas turbine engine thermal imaging system, wherein the camera is disposed to capture a plurality of thermal images of a rotating airfoil.

A further embodiment of the foregoing gas turbine engine thermal imaging system, wherein the camera is disposed to capture the plurality of thermal images while the gas turbine engine is in operation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s)

The invention claimed is:

1. A method for thermally imaging a moving workpiece of a gas turbine engine, the method comprising:
   assigning a plurality of geometric features including at least one integral thermal feature of the moving workpiece, and at least one artificial feature applied to the workpiece for diagnostic purposes;
   identifying one of the plurality of geometric features as a master feature, and locating the remainder of the plurality of geometric features relative to the master feature with relative actual coordinates;
   capturing thermal images the moving workpiece, including a reference image and a plurality of secondary images;
   for each image, identifying a pixel location of the master feature, and locating the remainder of the plurality of geometric features relative to the master feature with relative pixel coordinates;
   varying an offset, rotation, and scaling of the secondary images to minimize a relative difference between the relative pixel coordinates and the relative actual coordinates;
   combining the offset, rotated, and scaled secondary images with the reference image to form a composite image;
   assigning a bridging master feature and bridging secondary features;
   determining bridging actual coordinates of the bridging secondary features relative to the bridging master feature by direct study of the workpiece;
   calculating bridging pixel coordinates of the bridging secondary features relative to the bridging master feature within each of the LWIR images;
   varying an offset, rotation, and scaling of the bridging secondary images to minimize a relative difference between the bridging relative pixel coordinates and the bridging relative actual coordinates;
   combining the offset, rotated, and scaled secondary images with the reference image to form a bridging composite image; and
   combining the composite image and the bridging composite image to form an extended second order composite image.

2. The method of claim 1, wherein the integral thermal feature is a cooling hole.

3. The method of claim 1, wherein the artificial feature is a mask, target, or mark.

4. The method of claim 1, wherein each of the thermal images of the moving workpiece is an average image over multiple raw images.

5. The method of claim 1, wherein the thermal images are long wavelength infrared (LWIR) images.

6. The method of claim 5, wherein images from multiple LWIR cameras are included among the thermal images.

7. The method of claim 1, wherein varying an offset, rotation, and scaling of the secondary images to minimize a relative difference between the relative pixel coordinates and the relative actual coordinates comprises iteratively and sequentially varying each of the offset, rotation, and scaling to achieve local minima in difference between the relative pixel coordinates and the relative actual coordinates.

8. A method for processing a plurality of long wavelength infrared (LWIR) images of a workpiece, including a reference image and a plurality of secondary images, the method comprising:
   assigning a plurality of geometric features in each LWIR image, including a master feature and a plurality of secondary features;
   determining actual coordinates of the secondary features relative to the master feature by direct study of the workpiece;
   calculating pixel coordinates of the secondary features relative to the master feature within each of the LWIR images;
   varying an offset, rotation, and scaling of the secondary images to minimize a relative difference between the relative pixel coordinates and the relative actual coordinates;
   combining the offset, rotated, and scaled secondary images with the reference image to form a composite image;

assigning a bridging master feature and bridging secondary features;

determining bridging actual coordinates of the bridging secondary features relative to the bridging master feature by direct study of the workpiece;

calculating bridging pixel coordinates of the bridging secondary features relative to the bridging master feature within each of the LWIR images;

varying an offset, rotation, and scaling of the bridging secondary images to minimize a relative difference between the bridging relative pixel coordinates and the bridging relative actual coordinates;

combining the offset, rotated, and scaled secondary images with the reference image to form a bridging composite image; and combining the composite image and the bridging composite image to form an extended second order composite image.

9. The method of claim 8, wherein the integral thermal feature is a cooling hole.

10. The method of claim 8, wherein the artificial feature is a mask, target, or mark.

11. The method of claim 8, wherein each of the thermal images of the moving workpiece is an average image over multiple raw images.

12. The method of claim 8, wherein images from multiple LWIR cameras are included among the thermal images.

13. The method of claim 8, wherein varying an offset, rotation, and scaling of the secondary images to minimize a relative difference between the relative pixel coordinates and the relative actual coordinates comprises iteratively and sequentially varying each of the offset, rotation, and scaling to achieve local minima in difference between the relative pixel coordinates and the relative actual coordinates.

14. A gas turbine engine thermal imaging system comprising:

a camera disposed to capture a plurality of thermal images of a moving workpiece with geometric features including at least on integral thermal feature, and at least one artificial feature applied to the workpiece for diagnostic purposes; and a processor configured to produce a composite thermal image of the moving workpiece by:

identifying one of the plurality of geometric features as a master feature, and locating the remainder of the plurality of geometric features relative to the master feature with relative actual coordinates;

capturing thermal images the moving workpiece, including a reference image and a plurality of secondary images;

for each image, identifying a pixel location of the master feature, and locating the remainder of the plurality of geometric features relative to the master feature with relative pixel coordinates;

varying an offset, rotation, and scaling of the secondary images to minimize a relative difference between the relative pixel coordinates and the relative actual coordinates;

combining the offset, rotated, and scaled secondary images with the reference image to form a composite image;

assigning a bridging master feature and bridging secondary features;

determining bridging actual coordinates of the bridging secondary features relative to the bridging master feature by direct study of the workpiece;

calculating bridging pixel coordinates of the bridging secondary features relative to the bridging master feature within each of the LWIR images;

varying an offset, rotation, and scaling of the bridging secondary images to minimize a relative difference between the bridging relative pixel coordinates and the bridging relative actual coordinates;

combining the offset, rotated, and scaled secondary images with the reference image to form a bridging composite image; and combining the composite image and the bridging composite image to form an extended second order composite image.

15. The gas turbine engine thermal imaging system of claim 14, wherein the camera is a long wavelength infrared (LWIR) camera.

16. The gas turbine engine thermal imaging system of claim 14, wherein the camera is disposed to capture a plurality of thermal images of a rotating airfoil.

17. The gas turbine engine thermal imaging system of claim 14, wherein the camera is disposed to capture the plurality of thermal images while the gas turbine engine is in operation.

* * * * *